OR  3,917,378

United States Patent [19]
Gale

[11] 3,917,378
[45] Nov. 4, 1975

[54] FREQUENCY-ENCODED FOCUSSED IMAGE HOLOGRAM RECORD

[75] Inventor: Michael Thomas Gale, Langnau am Albis, Switzerland

[73] Assignee: RCA Corporation, New York, N.Y.

[22] Filed: May 13, 1974

[21] Appl. No.: 469,218

[30] Foreign Application Priority Data
Jan. 30, 1974 United Kingdom............... 04225/74

[52] U.S. Cl.................. 350/3.5; 350/162 SF; 358/5
[51] Int. Cl.²...................... G03H 1/28; G03H 1/02
[58] Field of Search............ 350/3.5, 162 SF; 358/5, 358/6, 44

[56] References Cited
UNITED STATES PATENTS
3,695,744  10/1972  Clay....................... 350/3.5
3,834,786  9/1974  Carlsen................... 350/3.5

OTHER PUBLICATIONS
Tatuoka, *Japanese Jour. of Applied Physics*, Vol. 10, No. 12, Dec. 1971, pp. 1742-1743.

Primary Examiner—Ronald J. Stern
Attorney, Agent, or Firm—Edward J. Norton; George J. Seligsohn

[57] ABSTRACT

A hologram comprising three superimposed parallel diffraction gratings, each modulated by a different primary color component of an imaged object and having a different spatial frequency related to that component, is embossed in a suitable record such that at least one of the gratings is rotated with respect to the other two. The coarsest beat frequency in "multicolor" areas of the hologram is thereby increased over that for a hologram comprising mutually-parallel gratings, whereby the resolution of the hologram—as observed in a focussed image hologram projector—is similarly increased.

2 Claims, 8 Drawing Figures

FREQUENCY-ENCODED FOCUSSED IMAGE HOLOGRAM RECORD

BACKGROUND OF THE INVENTION

This invention relates to a novel focussed image hologram and, particularly, to a frequency-encoded focussed image hologram having increased resolution capability.

In focussed image holography, a modulated carrier or diffraction grating is recorded by the interference of an effective reference beam of coherent light and an object beam thereof derived from an object being imaged onto the recording medium. Reconstruction of the wavefront of the object beam can be accomplished by means of a white light source; that is, a laser is not required for hologram "readout." Various techniques are known for color encoding focussed image holograms. See, for example, K. Biedermann, "Image Encoding in Modulated Gratings from 1899 to 1970," Optica Acta, Vol. 17, No. 8, pp. 631–635 (8/1970). One such technique compatible with the requirements for low-cost replication is frequency-encoding, wherein, typically, three superimposed mutually-parallel gratings of different carrier frequencies are each modulated by a correspondingly different primary color component of the imaged object. A hologram of this type is disclosed in a copending U.S. patent application entitled "Focussed Image Hologram Projector," assigned to the assignee of this application and filed concurrently herewith by M. T. Gale et al. In the novel projector of that application, a filamentary light source, condensing optics, a decoding slit, and projection optics are employed to display full-color reconstructions from frequency-encoded focussed image holograms.

The resolution capability of the typical frequency-encoded focussed image hologram is limited by the interaction of the three superimposed gratings in "multicolor" areas thereof. This interaction gives rise to various difference or beat frequencies, the coarser of which generally produce an undesirable fringe pattern observable in hologram readout or reconstruction. In the above-cited copending patent application, for example, the spatial frequencies of the gratings corresponding to the primary colors blue, green, and red, are 744, 645, and 526 lines per millimeter, respectively; and the coarsest difference frequency is 20 lines per millimeter, well within the resolution capability of the projection optics employed.

SUMMARY OF THE INVENTION

The novel focussed image hologram record comprises a plurality of modulated carriers of different spatial frequencies, wherein each of the carriers is a plane parallel diffraction grating recorded by the interference of a corresponding effective reference beam of coherent light and an object beam thereof derived from a correspondingly different spectral component of an object being imaged onto the record, and at least one of the gratings is rotated with respect to each of the other gratings.

Preferably, each of the carrier spatial frequencies corresponds to a different one of the primary colors, and the components of the three carrier spatial frequencies in a given direction are calculated so as to provide a full-color reconstruction when the record is illuminated by a filamentary white-light source and the diffracted light decoded by a rectangular slit, the filament and slit both extending in the given direction. Also preferably, the carrier spatial frequencies are related to the angle or angles of rotation of the gratings such that the colorimetry of the full-color reconstruction is constant.

DESCRIPTION OF THE PREFERRED EMBODIMENT

Figure 1:
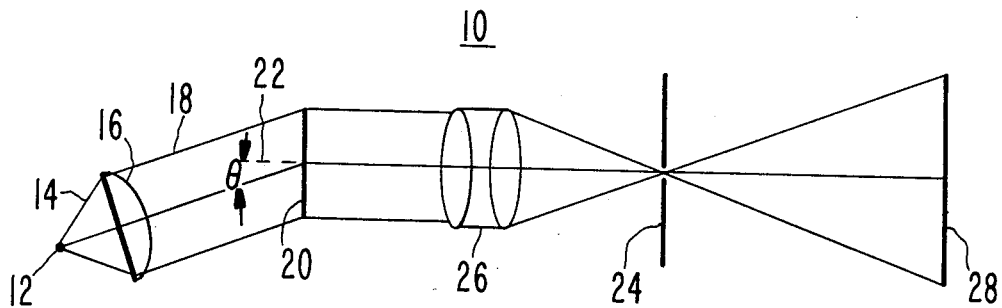
FIG. 1 is a schematic illustration of a novel projector for displaying a full-color reconstruction from a color-encoded focussed image hologram comprising three mutually-parallel diffraction gratings.

For purposes of illustration, an example of the novel projector disclosed in the above-cited copending patent application is shown in FIG. 1, wherein the projector 10 comprises a source of white light 12, the light 14 from which is collimated, in the plane or dimension shown, by a condenser lens 16. The collimated light 18 emerging from the lens 16 is, in turn, incident on a transmissive-type frequency-encoded focussed image hologram 20 at an angle $\theta$ with respect to the hologram normal 22. The focussed image hologram 20 comprises three superimposed mutually-parallel diffraction gratings, each modulated by a different primary color component of the imaged object, and each having a different spatial frequency related to that component. The spatial frequencies are calculated from the equation:

$$S \times \lambda = \sin \theta,$$

where $S$ is the spatial frequency corresponding to the primary color mean-wavelength $\lambda$. Thus, for a typical value of $\theta = 20°$, the spatial frequencies $S_b$, $S_g$, and $S_r$, corresponding to the primary colors blue ($\lambda_b = 4600A$), green ($\lambda_g = 5,300A$), and red ($\lambda_r = 6,500A$), are 744, 645, and 526 lines/mm, respectively.

Each grating of the focussed image hologram 20 diffracts its corresponding primary color in a first-order direction centered about the hologram normal 22. A spatial filter 24, located in the focal plane of a projection lens 26, then transmits the required portions of the incident color spectra diffracted by the three gratings and blocks the remaining portions thereof. A full-color reconstruction is thereby projected onto a suitable viewing screen 28, which typically comprises a fresnel lens-diffuser combination for viewing in transmission.

Because of the parallel relationship among the three gratings of the focussed image hologram 20, the elements of the projector 10 which affect the colorimetry thereof are constrained in only one plane. Thus the light source 12 can be a quartz-halogen lamp simply comprising a long narrow filament extending parallel to the direction of the grating lines. While the diameter or width of such a filamentary light source 12 is limited by the acceptable wavelength spread of the primary colors, the length thereof is limited mainly by the ability of the condenser lens 16 to collect the light 14 and direct it onto the focussed image hologram 20. Typically, the light source 12 has a filament about 1 mm in diameter and about 20 mm long and is rated at about 200 watts. The spatial filter 24 can then simply be an on-axis slit extending parallel to the filament of the light source 12, the slit 24 also typically having a diameter of about 1 mm and a length of about 20 mm.

Figure 3:
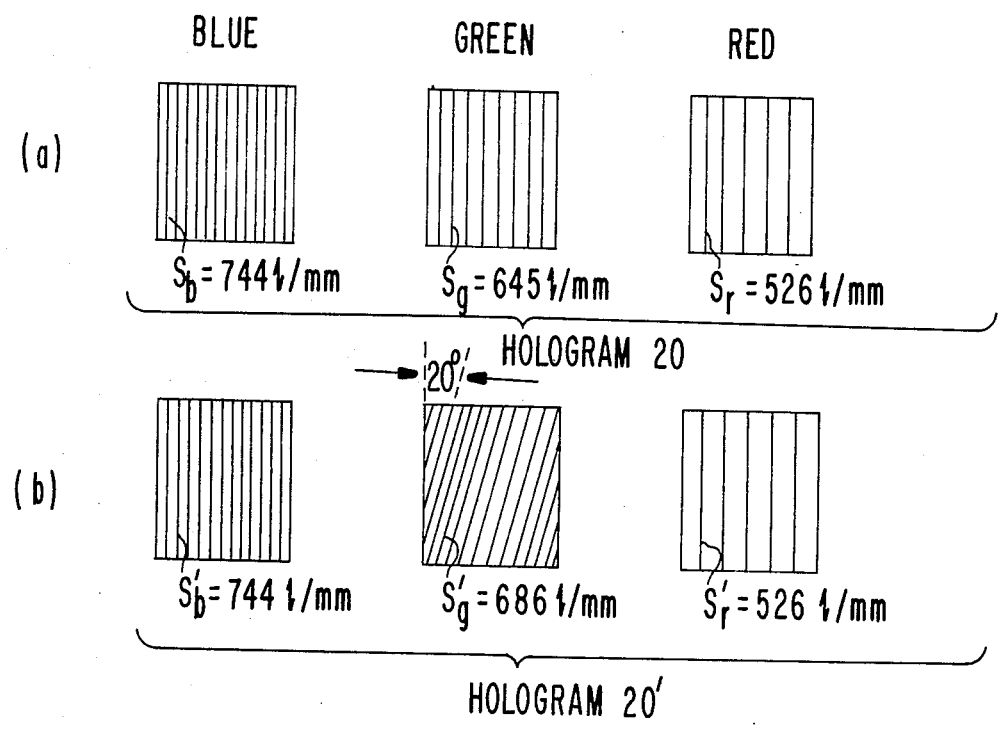
FIG. 3 is an illustration of the orientations and spatial frequencies of the gratings of (a) the hologram of FIG. 1 and of (b) an example of the novel hologram of this invention.
Figure 2:
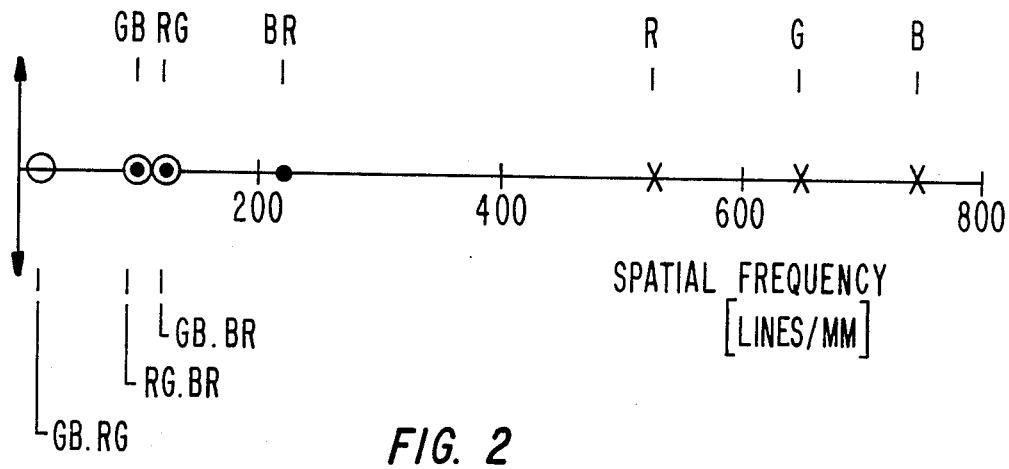
FIG. 2 is a plot of the spectrum of difference of beat frequencies generated by the interaction of the gratings of the hologram of FIG. 1.

The interaction of the three mutually-parallel gratings of the focussed image hologram 20, in the "multi-color" areas thereof, give rise to a spectrum of difference or beat frequencies. The spectrum generated by the primary spatial frequencies $S_b = 744$ lines per mm, $S_g = 645$ lines per mm, and $S_r = 526$ lines per mm, for example, is shown in FIG. 2, wherein it is seen that the coarsest beat frequency is 20 lines per mm. This beat frequency, which is well within the resolution capabilities of the projection lens 26 and slit 24, produces an undesirable fringe pattern superimposed on the projected reconstruction displayed on the screen 28. This limitation on hologram resolution is eliminated in the present invention, preferably as follows:

A transmissive-type frequency-encoded focussed image hologram 20' comprises three superimposed parallel diffraction gratings, each modulated by a different primary color component of the imaged object, and each having a different spatial frequency related to that component. But, whereas the three gratings of the focussed image hologram 20 are mutually parallel, i.e., parallel to one another, only two of the gratings of the focussed image hologram 20' are parallel to each other; the third, e.g., the green grating, is rotated through an angle $\phi$ with respect to the other two gratings. In addition, the spatial frequency of the rotated green grating of the focussed image hologram 20' is increased over that of the green grating of the focussed image hologram 20 by a factor $(\cos\phi)^{-1}$, to maintain a constant frequency component thereof parallel to the other two gratings and thereby maintain the colorimetry of the projector 10 with the focussed image hologram 20' substituted therein. Thus, for a typical value of $\phi = 20°$, the spatial frequency of the rotated green grating of the focussed image hologram 20' is $S_g' = 686$ lines per mm. The orientations and spatial frequencies of the gratings of the focussed image holograms 20 and 20' are shown in FIG. 3.

Figure 4:
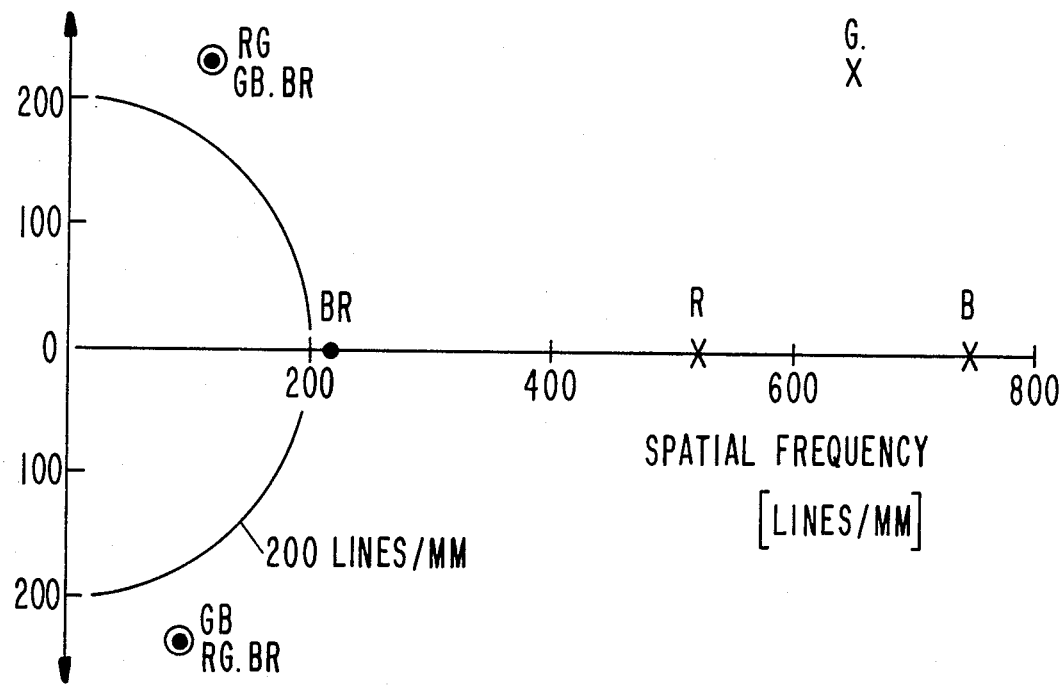
FIG. 4 is a plot of the spectrum of difference or beat frequencies generated by the interaction of the gratings of the example of the novel hologram of FIG. 3(b)
Figure 5:
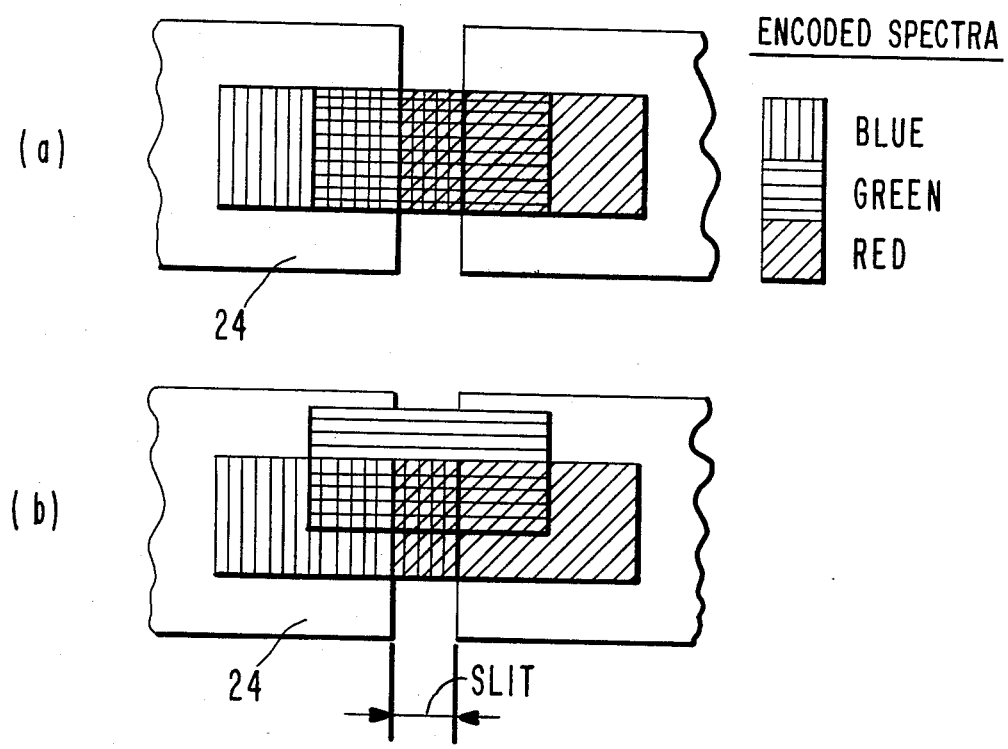
FIG. 5 is an illustration of the spectra at the spatial filtering plane of the projector of FIG. 1 from (a) the hologram of FIG. 1 and from (b) the example of the novel hologram of FIG. 3(b)

The interaction of the three gratings of the focussed image hologram 20', in the "multi-color" areas thereof, give rise to a new spectrum of difference or beat frequencies. The spectrum generated by the primary spatial frequencies $S_b' = 744$ lines per mm, $S_g' = 686$ per mm, and $S_r' = 526$ lines per mm, for example, is shown in FIG. 4, wherein it is seen that the coarsest beat frequency is now 218 lines per mm. This beat frequency is well above the resolution capabilities of the projection lens 26 and slit 24 of the projector 10, so that no undesirable fringe pattern is displayed on the screen 28 with the focussed image hologram 20' substituted therein. Moreover, no modification of the optics of projector 10 is required, since the effect of rotating the green grating of the focussed image hologram 20' is merely to shift the transmitted spectrum from that grating by a sufficiently small amount in a direction parallel to the extended slit 24. This effect is shown in FIG. 5.

Figure 6:
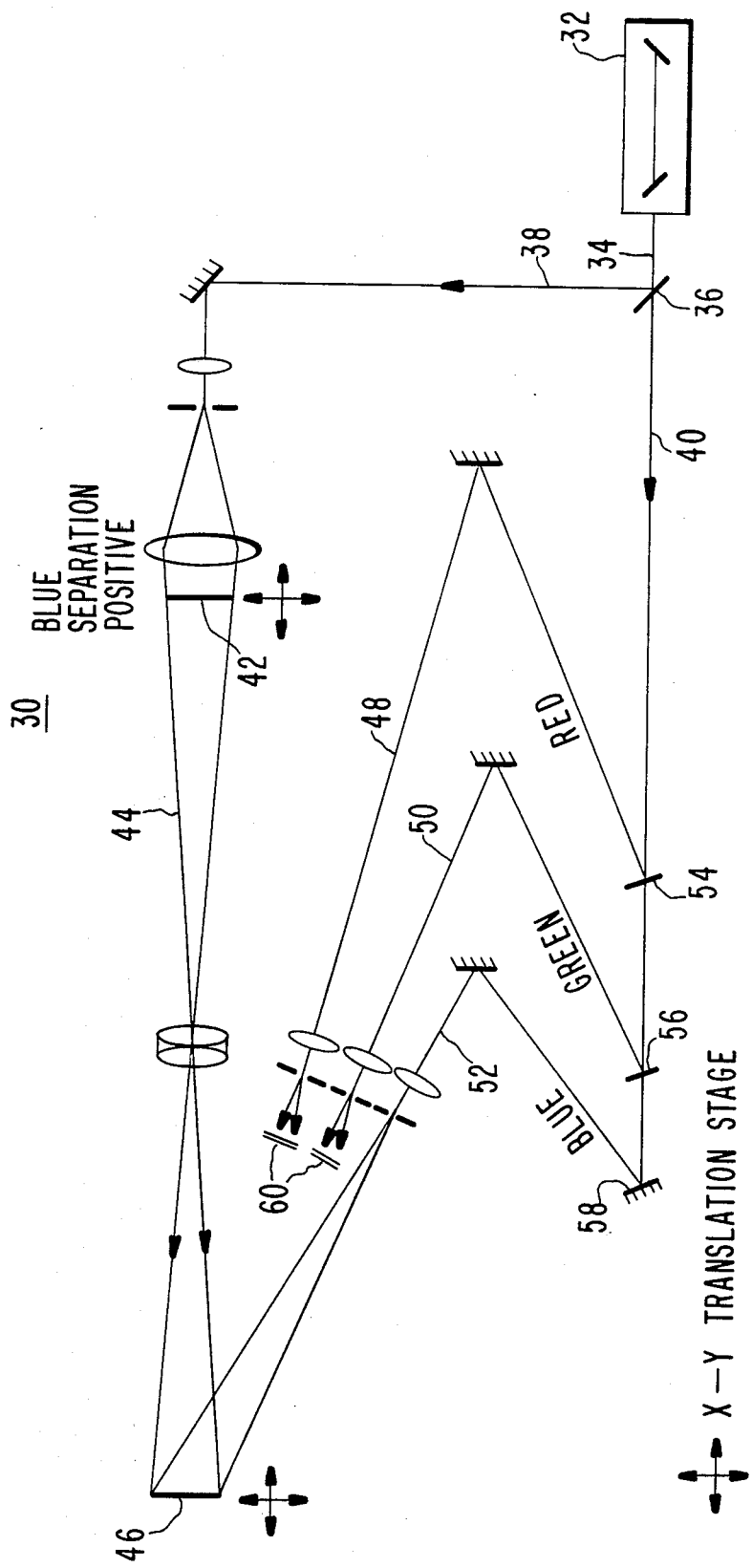
FIG. 6 is a schematic illustration of a system for recording the example of the novel hologram of FIG. 3(b).

The focussed image hologram 20' may be one of a plurality of such holograms stored on a suitable card and displayed sequentially in the projector 10. Typically, 40 such holograms, each about 10 mm × 14 mm, are produced in a 10 × 4 array as follows:

Each original object is reduced to a given size color transparency, which is then imaged onto a photographic plate through appropriate color filters to produce three color separation positives. Holographic recording is then effected by means of a system 30, shown in FIG. 6, which coomprises a conventional He-Cd laser 32 for producing a beam of coherent light 34. The beam 34 is incident on a partially reflecting mirror 36, which splits the beam 34 into a reflected first portion 38 and a transmitted second portion 40. The first portion 38 is then transmitted by appropriate optics through one of the color separation positives, e.g., the blue separation positive 42. The light 44 modulated by the color separation positive 42 is, in turn, imaged onto a photoresist plate 46. The second portion 40 of the coherent light beam 34 is itself split into three reference beams 48, 50 and 52, by means of partially reflecting mirrors 54 and 56 and reflecting mirror 58. The mirrors 54, 56, and 58 are positioned such that each of the reference beams 48, 50 and 52, corresponding to the red, green, and blue separation positives, respectively, is set at a different pre-determined angle with respect to the modulated light or information beam 44.

The appropriate reference beam, e.g., the blue reference beam 52, is then imaged onto the photoresist plate 46, while the other reference beams 48 and 50 are blocked therefrom by shutters 60. The information beam 44 and reference beam 52 then interfere to record a relief-phase focussed image hologram on the photoresist plate 46. By successive exposures, using the other color separation positives and their respective reference beams, three such focussed image holograms are recorded in superposition on the plate 46, each hologram corresponding to a different one of the separation positives and having a carrier frequency determined by the respective reference beam angle. The rotation of the green grating is readily effected by changing the green reference beam angle an appropriate amount in the vertical plane only. Thereafter, the photoresist of plate 46 is developed, and the superimposed holograms therein are replicated by known techniques comprising the making of a metal master and embossng into transparent plastic, techniques disclosed, for example, by J. R. Frattarola, U.S. Pat. No. 3,758,649 (9/1973), also assigned to the assignee of this application, and R. A. Bartolini et al., "Replication of Relief-Phase Holograms for Prerecorded Video," Jour. Electrochem. Soc., Vol. 120, No. 10, pp. 1,408–1,413 (10/1973).

GENERAL CONSIDERATIONS

It should be understood that the invention herein is not limited to the embodiment described above. For example, rotation of all three diffraction gratings can increase the resolution capability of the focussed image hologram beyond that of the focussed image hologram 20'. Thus, rotation of the blue, green and red gratings through corresponding angles of 25°, 15° and 10° with respect to the mutually-parallel gratings of focussed image hologram 20—requiring, in turn, correspondingly increased spatial frequencies of 820, 668, and 534 lines per millimeter to maintain the colorimetry of the projector—will produce a coarsest beat frequency of 291 lines per millimeter. Moreover, the novel focussed image hologram need not be viewed only with the projector 10 of FIG. 1. Other compatible examples of the novel projector of the above-cited copending patent application are disclosed therein. Also, the viewing means may be other than a projector, such as a television system. Furthermore, other, including synthetic, methods and systems for producing the novel frequency-encoded focussed image hologram may be employed.

What is claimed is:

1. In a frequency-encoded focussed image hologram record capable of reconstructing a given recorded multicolor scene in response to said record being illuminated with a line source of white light and then projected through a longitudinal slit spatial filter oriented substantially parallel to said line source, said record comprising three superimposed spatially amplitude-modulated parallel diffraction gratings each of which corresponds to a different one of three primary spectral wavelength color components of said given recorded multicolor scene; the improvement wherein:

a. a first of said three diffraction gratings corresponding to the shortest spectral wavelength primary color component has a given line orientation, has a predetermined line frequency, and is spatially amplitude-modulated in accordance with the relative distribution of said shortest spectral wavelength primary color component of said given recorded multicolor scene;

b. a second of said three diffraction gratings corresponding to the longest spectral wavelength primary color component has a line orientation substantially parallel to said given line orientation, has a line frequency substantially equal to the ratio of said shortest spectral wavelength to said longest spectral wavelength multiplied by said predetermined line frequency, and is spatially amplitude-modulated in accordance with the relative distribution of said longest spectral wavelength primary color component of said given recorded multicolor scene, and c. a third of said three diffraction gratings corresponding to the spectral wavelength primary color component intermediate said shortest and longest spectral wavelength primary color components has a line orientation rotated through a given angle with respect to said given line orientation, said given angle being sufficiently small to substantially maintain colorimetry of said reconstructed given multicolor scene, said third diffraction grating having a line frequency substantially equal to the ratio of said shortest spectral wavelength to said intermediate spectral wavelength multiplied by said predetermined line frequency and divided by the cosine of said given angle, and said third diffraction grating being spatially amplitude-modulated in accordance with the relative distribution of said intermediate spectral wavelength primary color component of said given recorded multicolor scene.

2. The frequency-encoded focussed image hologram record defined in claim 1, wherein said predetermined line frequency of said first diffraction gratng is substantially 744 lines per millimeter, said line frequency of said second diffraction grating is substantially 526 lines per millimeter, said given angle is substantially 20°, and said line frequency of said third diffraction grating is substantially 686 lines per millimeter.

* * * * *

UNITED STATES PATENT OFFICE
CERTIFICATE OF CORRECTION

PATENT NO. : 3,917,378
DATED : November 4, 1975
INVENTOR(S) : Michael Thomas Gale It is certified that error appears in the above-identified patent and that said Letters Patent are hereby corrected as shown below:

Column 1, line 27, after "application" insert --Serial Number 469,219--

Column 4, line 15, change "coomprises" to --comprises--

Column 6, line 32, change "gratng" to --grating--

Signed and Sealed this twenty-third Day of March 1976

[SEAL]

Attest:

RUTH C. MASON
*Attesting Officer*

C. MARSHALL DANN
*Commissioner of Patents and Trademarks*